United States

Runciman

4,029,389

June 14, 1977

[54] RADIATION SCANNING SYSTEM

[75] Inventor: Herbert Morrison Runciman, Glasgow, Scotland

[73] Assignee: Barr and Stroud Limited, Glasgow, Great Britain

[22] Filed: June 9, 1976

[21] Appl. No.: 694,484

[30] Foreign Application Priority Data

July 26, 1975 United Kingdom ............ 31392/75

[52] U.S. Cl. ...................................... 350/7; 350/55; 350/294

[51] Int. Cl.² ........................................ G02B 27/17

[58] Field of Search ................ 350/6, 7, 2, 175 SL, 350/175 TS, 285, 225, 227, 55, 27, 199, 294; 178/7.6, 6.7

[56] References Cited

UNITED STATES PATENTS

| | | | |
|---|---|---|---|
| 2,920,136 | 1/1960 | Peterson | 350/2 |
| 3,443,853 | 5/1969 | Todd | 350/294 |
| 3,460,886 | 8/1969 | Rumsey | 350/55 |

*Primary Examiner*—John K. Corbin
*Assistant Examiner*—Ben W. delos Reyes
*Attorney, Agent, or Firm*—Mason, Fenwick & Lawrence

[57] ABSTRACT

A radiation scanning system which includes a radiation detector located at the focus of an objective lens element and a radiation scanning element arranged to scan radiation emanating from a field of view across the detector. The radiation forms a primary pupil, and one of said elements is located at a conjugate pupil formed by an optical assembly which comprises first and second concave part-spherical reflectors respectively having their centers of curvature substantially optically coincident with the locations of the primary pupil and the conjugate pupil, and a convex reflector substantially coincident with the locus of the focii formed by parallel beams of radiation emanating from the primary pupil and incident upon the first concave reflector.

8 Claims, 8 Drawing Figures

RADIATION SCANNING SYSTEM

This invention relates to radiation scanning systems.

Various forms of radiation scanning systems are already known whereby radiation from a field of view is scanned by one or more scanning elements across a detector which is located at the focus of an objective lens. The scanning element may take the form of a simple 'flap' mirror which oscillates about an axis passing through the mirror surface, or it may take the form of a continuously rotated drum carrying a plurality of mirrors. Several difficulties arise from the use of such scanning elements either singly or in combination. For example, if the detector is an elongate array, where the objective lens is located between the detector and the scanning element the objective lens requires to be larger than the scanning element. Furthermore, if the scanning element is a single flap mirror only a single dimension of scan results. A second flap mirror can be used to provide a second dimension of scan but this results in the scan pupils being separated which in turn requires oversize optic elements. Alternatively, the scan pupils can be made coincident if the second mirror is oscillated about an axis which is removed from the reflective surface of the mirror but this results in a system of high moment of inertia so that rapid scanning becomes impracticable. With a drum scanner rapid scanning may be achieved either in one or two dimensions utilising a system which disects and recombines the radiation prior to the objective lens, but for a given resolution this system limits the dimension of the detector in the scan direction, due to the geometry of the scanning element.

We have now discovered that some or all of the foregoing disadvantages may be overcome at least in part by providing in the radiation path between the detector and the radiation-receiving element which defines the size of the primary pupil one or more conjugate pupils of the primary pupil, and by strategically arranging elements forming the scanning system with respect to these conjugate pupils.

It is an object of the present invention to provide an improved form of scanning system whereby one or more of the foregoing disadvantages may be obviated or mitigated.

According to the present invention there is provided a radiation scanning system comprising a radiation detector located at the focus of an objective lens element, and a radiation scanning element arranged to scan radiation emanating from a field of view across said detector, wherein said radiation forms a primary pupil and one of said elements is located at a conjugate pupil formed by an optical assembly comprising first and second concave part-spherical reflectors respectively having their centres of curvature substantially optically coincident with the locations of the primary pupil and the conjugate pupil, and a convex reflector substantially coincident with the locus of the focii formed by parallel beams of radiation emanating from said primary pupil and incident upon the first concave reflector.

The convex reflector may form part of a sphere or part of a cylinder.

Preferably said scanning element defines said primary pupil and said lens element is located at said conjugate pupil. Alternatively said primary pupil may be defined by a first scanning element and a second scanning element may be located at said conjugate pupil. The or each scanning element may be in the form of a flap mirror or a drum scanner and the latter may be of the radiation disecting and recombining type. The scanning element may be refractive, such as, Risley prisms.

Said conjugate pupil may be one of a series of such pupils formed by a succession of similar optical assemblies and elements of the scanning system may be located at each pupil thereof.

Embodiments of the present invention will now be described by way of example with reference to the accompanying drawings, wherein.

Figure 1:
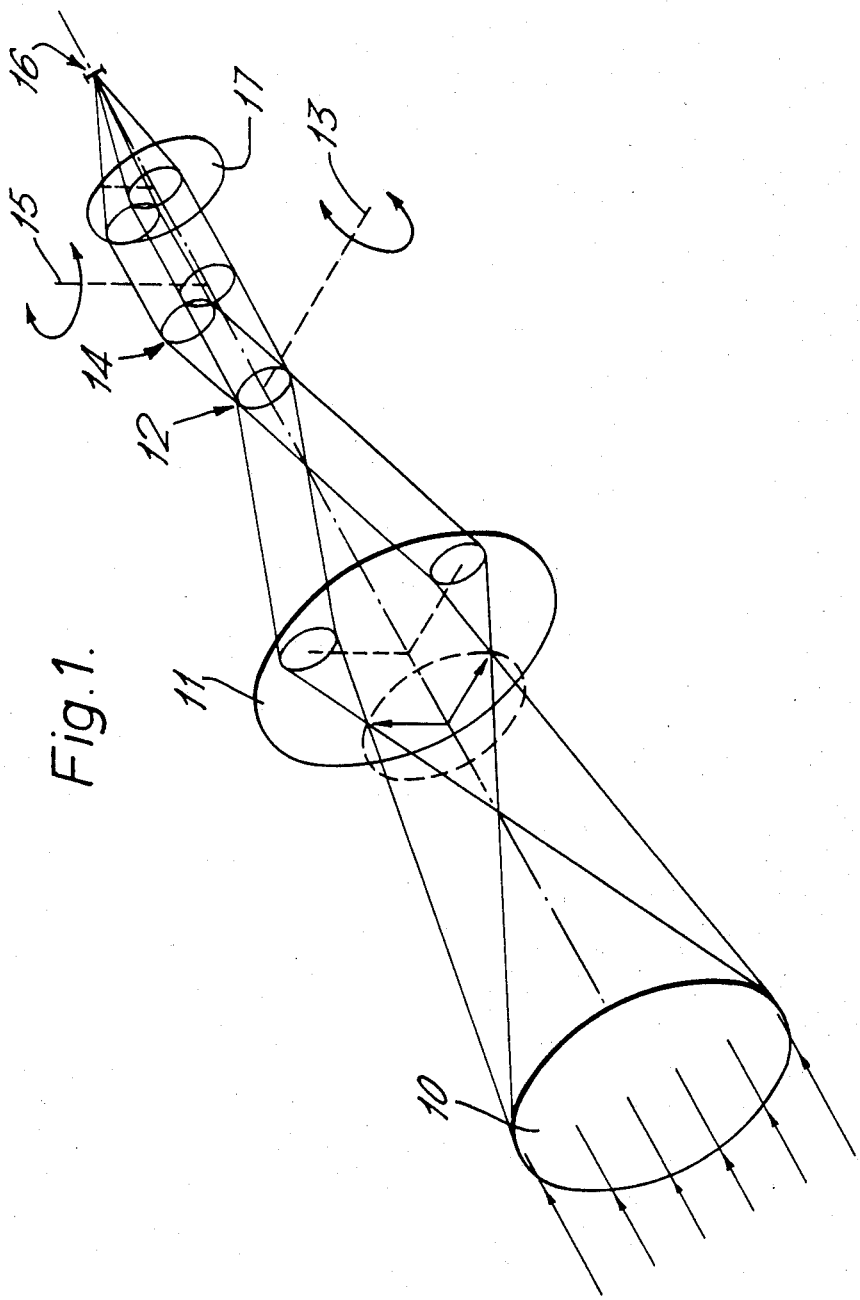
FIG. 1 is an unfolded ray diagram illustrating prior art.

As is shown in FIG. 1 of the drawings parallel beams of radiation emanating from a field of view are incident upon a lens 10 which in co-operation with a lens 11 forms a pupil 12. A first scanning element (not shown) is located at the pupil 12 and scans radiation about an axis 13. A second scanning element (not shown) is located adjacent the pupil 12 at a location 14 and scans radiation about an axis 15. The two-dimensionally scanned radiation is then focussed upon a detector 16 by a lens 17. Because the scanning element at the location 14 receives radiation from the first scanning element over an area which is greater than the pupil 12 the lens 17 requires to be considerably larger than would otherwise be necessary and the detector 16 is required to have an acceptance angle larger than would otherwise be required and this latter feature degrades the performance of infra-red radiation detectors.

Figure 2:
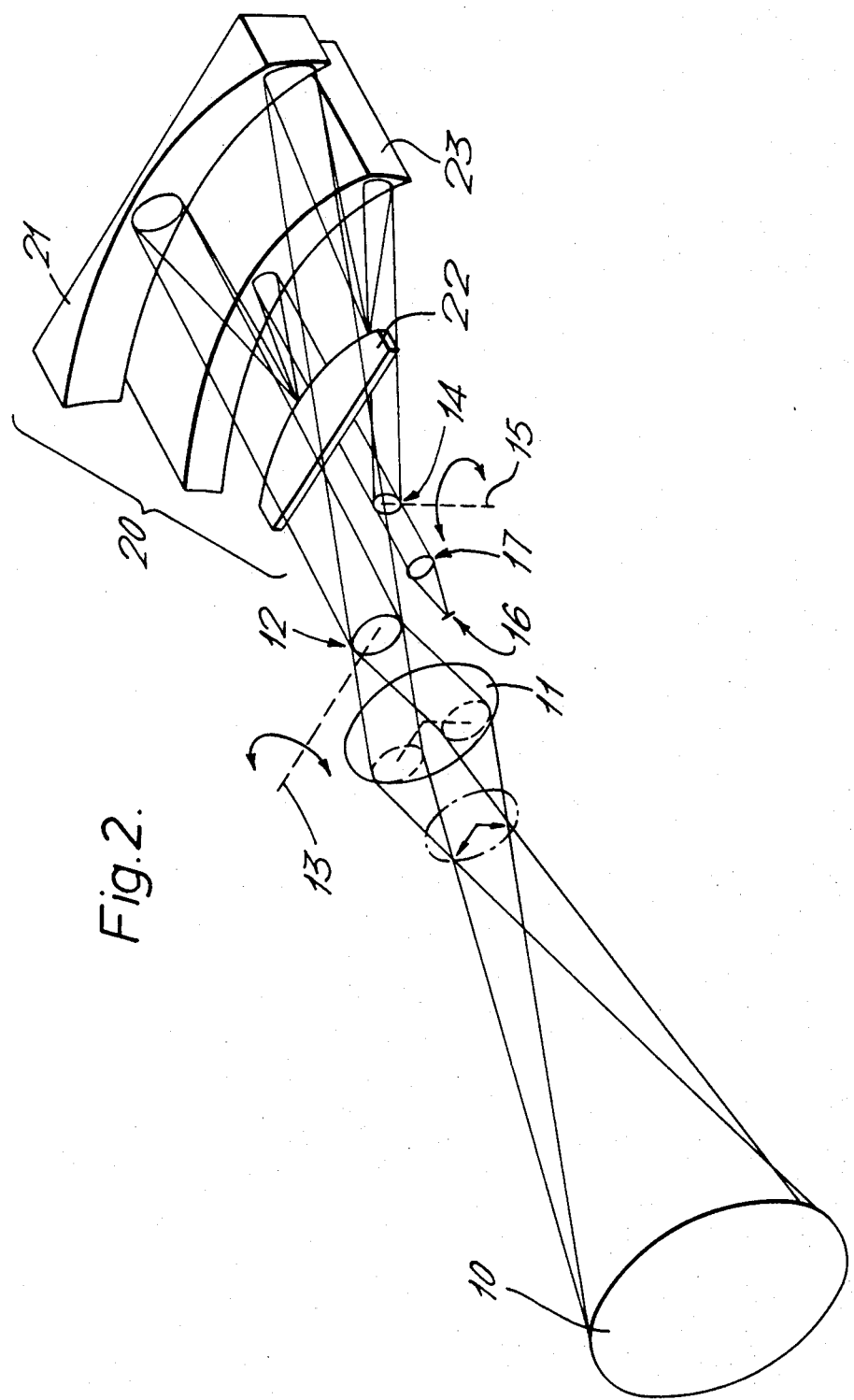
FIG. 2 illustrates a system according to the present invention.

As is shown in FIG. 2 in accordance with the present invention an optical assembly 20 is interposed between the pupil 12 and the location 14 of the second scanning element, the optical assembly being arranged and dimensioned as will be explained to cause the radiation at the location 14 to be the optical conjugate of the radiation at the pupil 12; that is, a pupil is formed at the location 14. The assembly 20 comprises a first concave part-spherical reflector 21, a convex part-spherical reflector 22 and a second concave part-spherical reflector 23 and these reflectors are arranged so that radiation from the first scanning element at the pupil 12 is reflected from reflector 21 to reflector 22 to reflector 23 and to the scanning element at the location 14.

Figure 3:
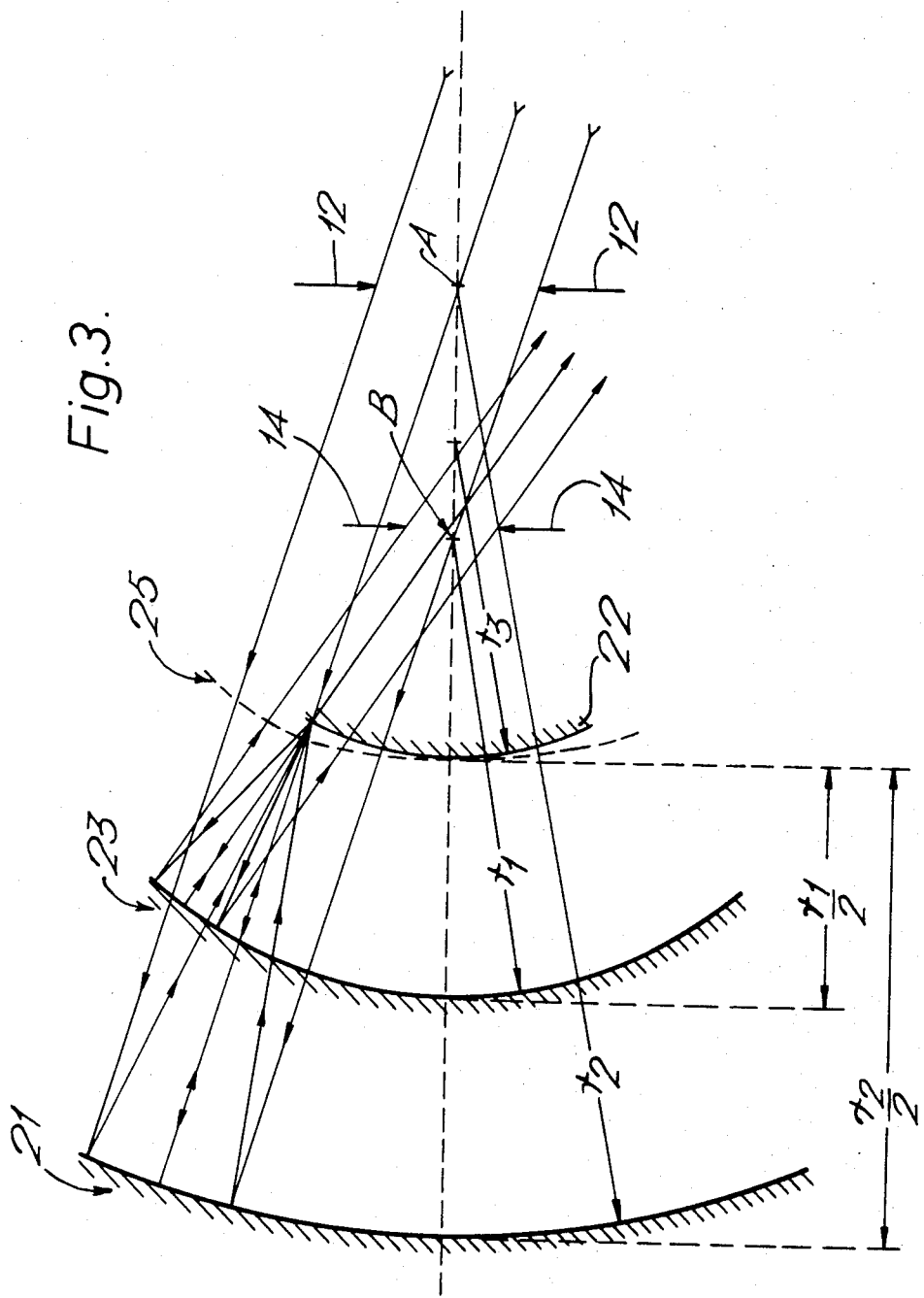
FIG. 3 is useful in appreciating the characteristics of a detail of the system of FIG. 2.

In order that the radiation at the locations 12 and 14 is optically conjugate the reflectors 21, 22 and 23 require to have particular dimensions as will be explained with reference to FIG. 3. The centre of curvature A of the reflector 21 is located at the pupil 12 and the reflector 22 is substantially coincident with the locus 25 of the focii formed by parallel beams of radiation emanating from the pupil 12 and reflected from the reflector 21. The reflector 23 has its centre of curvature E located at the conjugate pupil 14 and the radius of curvature $r_1$ of the reflector 23 determines the size of the pupil 14.

If the reflector 22 has a radius of curvature $r_3$, the reflector 23 has a radius of curvature $r_1$ and the reflector 21 has a radius of curvature $r_2$ it can be shown that, to a first approximation, $$r_3(1+m) = r_2 \ 32 \ r_1 m$$

where $m$ is the magnification factor.

Figure 4:
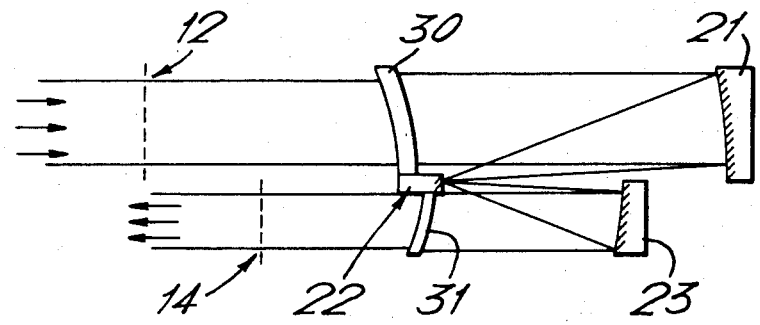
FIG. 4 illustrates a modification of a detail.

It will be appreciated that a more accurate determination of the relationship between $r_1$, $r_2$, $r_3$ and $m$ can be made depending upon the required field, aperture and aspherisation. If optical correction elements, such as the lenses 30,31 of FIG. 4 are used the abovementioned relationship will not hold strictly true and optimisation would be required.

Figure 5:
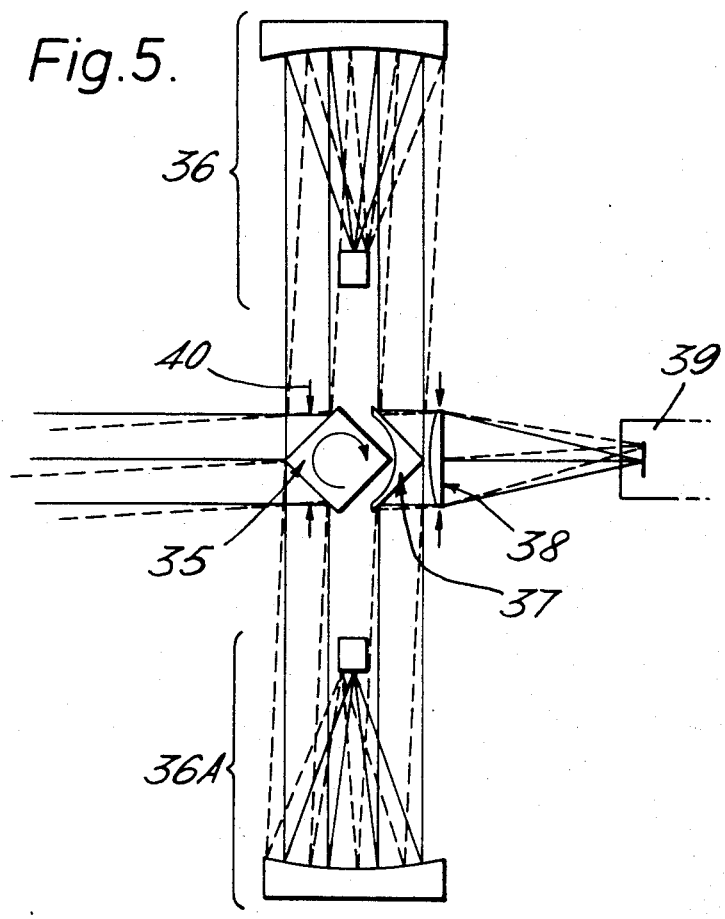
FIGS. 5 to 8 illustrate different embodiments of the system according to the present invention.

One embodiment of radiation scanning system according to the present invention is shown in FIG. 5 and comprises a four-sided drum scanning element 35 which defines a primary pupil 40 and operates to disect the beam of incident radiation, the disected portions being reflected from a pair of optical assemblies 36,36A to a recombining reflector 37 and is focussed by a lens 38 located at the conjugate pupil formed by the assemblies 36,36A onto a detector 39. The assemblies 36,36A are each of the type described in FIGS. 2 to 4 with unity magnification ($m$) which causes the pupil size at the lens 38 to equal that at the pupil 40 and the two part spherical concave reflectors are of equal radius of curvature so that they may be combined into a single element. If so desired the pupil 40 may be formed by a telescope such as the lenses 10,11 of FIGS. 1 and 2. By virtue of this embodiment the length of the detector 39 taken in the direction of scan need not be restricted.

Figure 6:
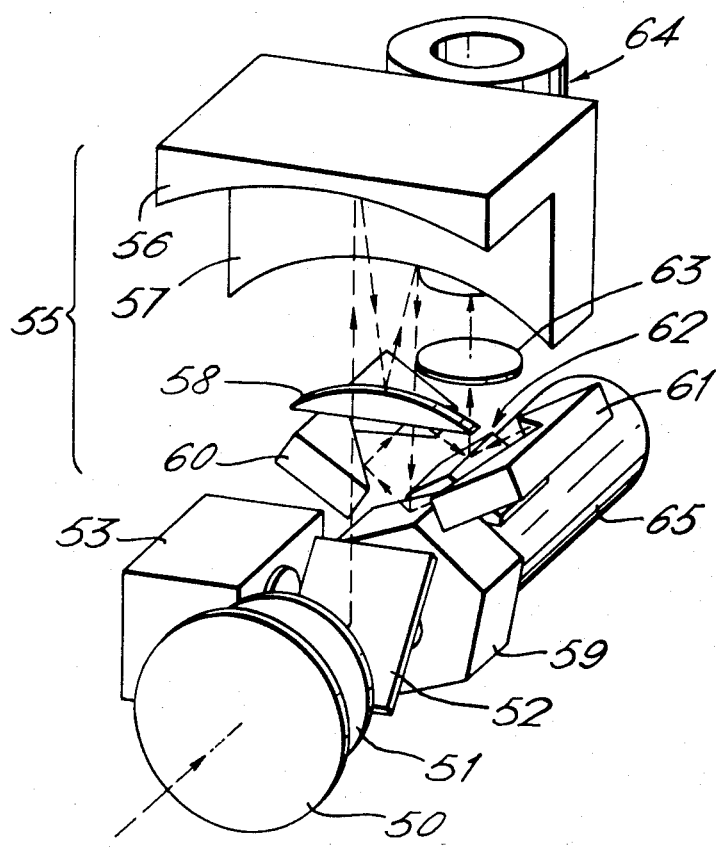

Another system in accordance with the present invention is illustrated in FIG. 6. This comprises a telescope having lenses 50,51 which forms a pupil of the incident radiation on a flap mirror 52 driven by a motor 53. Radiation from the mirror 52 is reflected from an optical assembly 55 formed by elements 56,57,58 onto a second scanning element formed by a mirror drum 59 which is arranged to disect the incident radiation into two beams which are respectively reflected from fold mirror assemblies 60,61, onto a recombining reflector 62 to be focussed by a lens 63 onto a narrow detector 64. The mirror drum 59 is driven by a motor 65. In this arrangement the assembly 55 forms at the location of the mirror drum 59 a conjugate pupil of the pupil formed at the location of the flap mirror 52.

The embodiment of FIG. 6 is limited to use with a short detector by virtue of the fact that the recombining reflector 62 is not located at a pupil of the system. This limitation may be overcome as shown in FIG. 7 by modifying the fold mirrors 60,61 to form optical assemblies 70,71 of the type illustrated in FIG. 2 and respectively comprising elements 72,73,74 and 75,76,77 which are arranged to form a conjugate pupil at the location of the recombining reflector 62.

Figure 7:
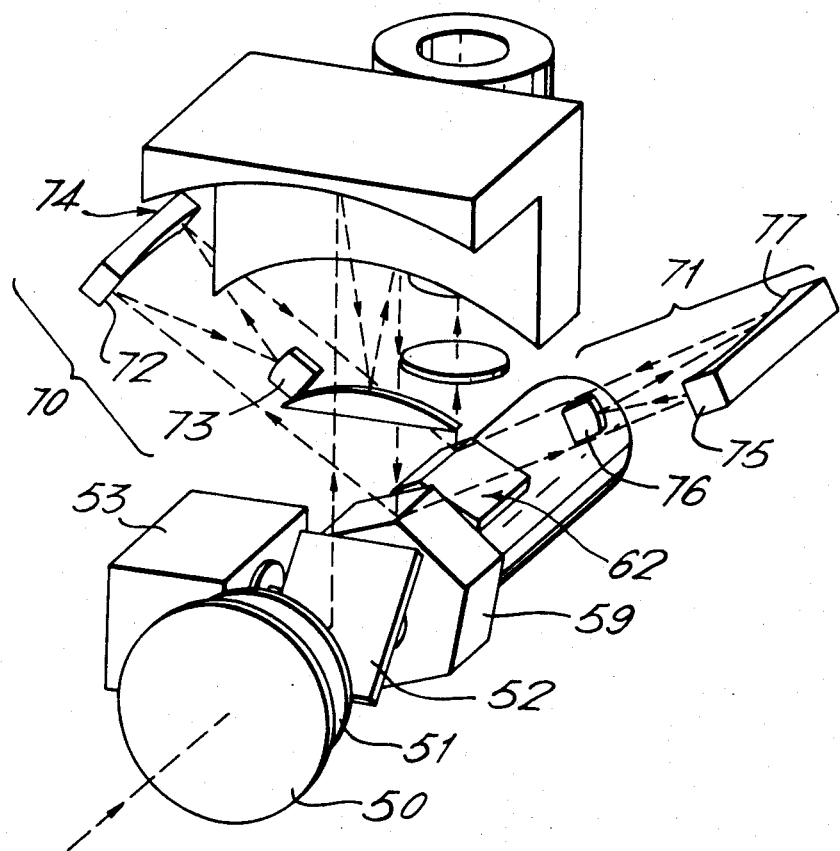
Figure 8:
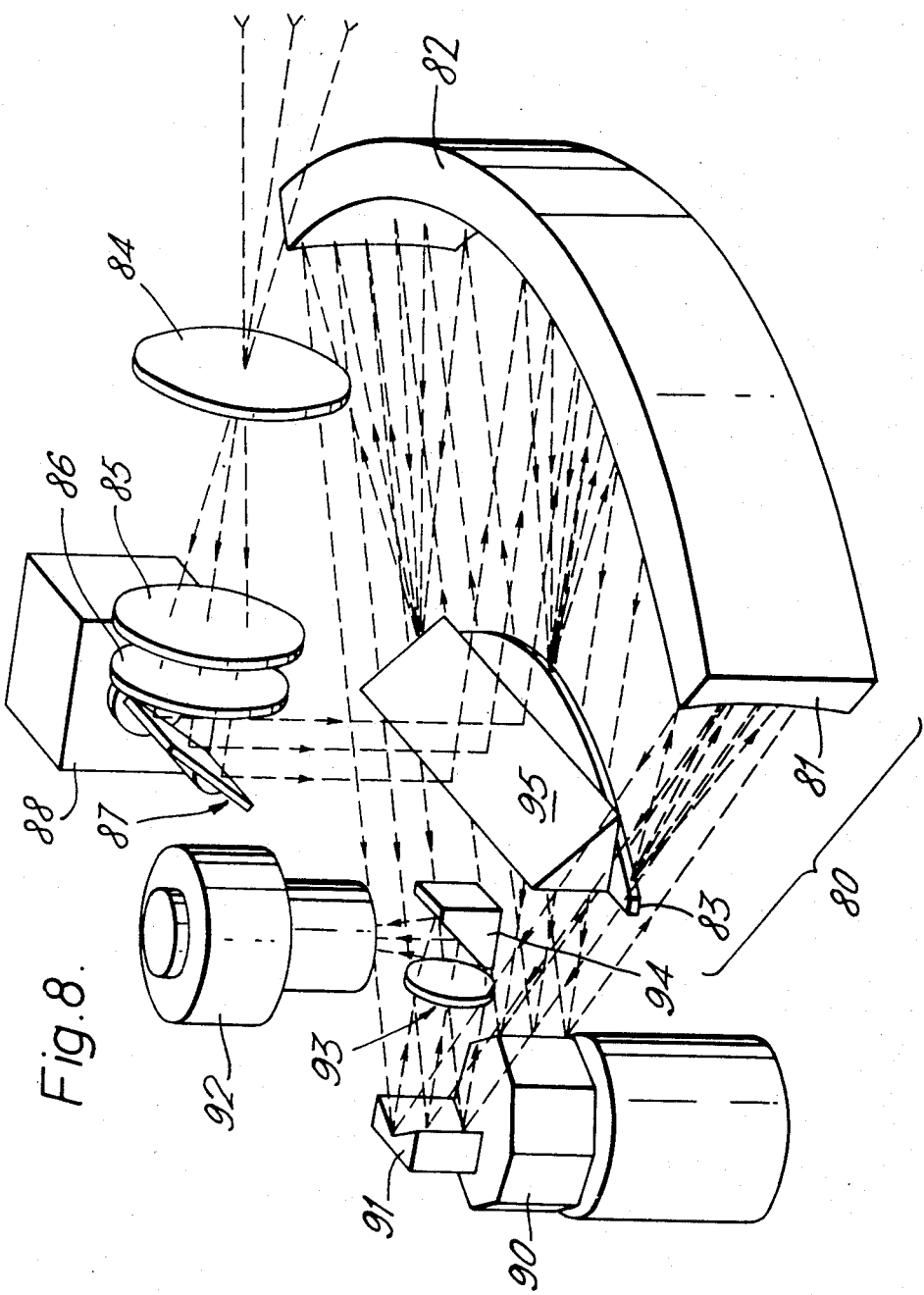

In the embodiment of FIG. 7 the magnification factor $m$ can differ between the two directions of scan. If such a difference is not required and unity magnification is acceptable the embodiment of FIG. 8 can be utilised where a single optical assembly 80, formed by elements 81,82 and 83 is used in a multireflection system to provide two conjugate pupils. In FIG. 8 a telescope having elements 84,85,86 form a pupil at the location of a flap mirror 87 which is driven by a motor 88. A conjugate of this pupil is formed by the assembly 80 at the location of a mirror drum 90 which is dimensioned to disect the incident radiation. The reflected and disected beams of radiation are each reflected by the assembly 80 onto a recombining reflector 91 which is located at a pupil which is the conjugate of the pupil at the surface of the drum 90. Radiation from the reflector 91 is focussed onto the detector 92 by lens 93. It will be noted that in this embodiment a fold mirror 94 is located between the lens 93 and the detector 92. A further fold mirror 95 is located between the flap mirror 87 and the curved reflectors 81,82 which are integral. Consequently, the flap 87 is located at a point which is optically coincident with the centre of curvature of the reflector unit 81,82. One of the advantages of the present invention is that by utilising an optical assembly which provides magnification a wide angle scanning system can be designed as a match to a relatively simple telescope.

What is claimed is:

1. A radiation scanning system comprising a radiation detector located at the focus of an objective lens element and a radiation scanning element arranged to scan radiation emanating from a field of view across said detector, wherein said radiation forms a primary pupil and one of said elements is located at a conjugate pupil formed by an optical assembly comprising first and second concave part-spherical reflectors respectively having their centres of curvature substantially optically co-incident with the locations of the primary pupil and the conjugate pupil, and a convex reflector substantially coincident with the locus of the focii formed by parallel beams of radiation emanating from said primary pupil and incident upon the first concave reflector.

2. A system as claimed in claim 1, wherein said scanning element defines said primary pupil and said lens element is located at said conjugate pupil.

3. A system as claimed in claim 1, wherein said primary pupil is defined by a first scanning element and a second scanning element is located at said conjugate pupil 4. A system as claimed in claim 1, wherein said conjugate pupil is one of a series of such pupils formed by a succession of similar optical assemblies, and elements of the scanning system are located at each such pupil.

5. A system as claimed in claim 1, wherein said convex reflector forms part of a sphere.

6. A system as claimed in claim 1 wherein said convex reflector forms part of a cylinder.

7. A system as claimed in claim 1, wherein the or each scanning element is in the form of a flap mirror.

8. A system as claimed in claim 1 wherein the or each scanning element is in the form of a drum scanner.

* * * * *